United States Patent
Gartner et al.

(10) Patent No.: US 6,785,381 B2
(45) Date of Patent: Aug. 31, 2004

(54) TELEPHONE HAVING IMPROVED HANDS FREE OPERATION AUDIO QUALITY AND METHOD OF OPERATION THEREOF

(75) Inventors: Martin Gartner, Taufkirchen (DE); Thomas D. Slagle, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 449 days.

(21) Appl. No.: 09/994,405

(22) Filed: Nov. 27, 2001

(65) Prior Publication Data

US 2003/0099345 A1 May 29, 2003

(51) Int. Cl.[7] .................................................. H04M 1/00
(52) U.S. Cl. ........................ 379/342.01; 379/388.01; 381/71.1; 455/296
(58) Field of Search .................. 379/387.01, 387.02, 379/388.01, 388.03, 388.04, 388.07, 392.01; 381/93, 66, 95, 96, 94.7, 94.1, 91, 92, 71.1, 122; 455/296, 303

(56) References Cited

U.S. PATENT DOCUMENTS

| | | | | |
|---|---|---|---|---|
| 5,471,538 A | * | 11/1995 | Sasaki et al. | 381/92 |
| 5,953,380 A | * | 9/1999 | Ikeda | 381/94.1 |
| 6,549,627 B1 | * | 4/2003 | Rasmusson et al. | 381/94.1 |
| 2001/0028720 A1 | * | 10/2001 | Hou | 381/92 |
| 2002/0031234 A1 | * | 3/2002 | Wenger et al. | 381/86 |

* cited by examiner

Primary Examiner—Minsun Oh Harvey
Assistant Examiner—Jefferey Harold

(57) ABSTRACT

A telephone having a hands-free mode of operation. The telephone includes a pair of microphones spaced apart from each other. Each microphone receives sound in hands-free mode of operation and provides audio signals representative of received sounds. The audio signals from each microphone may be converted to digital audio signals. The digital audio signals are presented to a fixed delay path and a variable delay path. Audio signals from both paths are combined and filtered in an adjustable filter to remove noise based upon a prior determination of the noise source location and the voice spectrum derived from the digital audio signals.

17 Claims, 3 Drawing Sheets

TELEPHONE HAVING IMPROVED HANDS FREE OPERATION AUDIO QUALITY AND METHOD OF OPERATION THEREOF

BACKGROUND OF THE INVENTION

1. Field of the Invention

The present invention is related to telephones and more particularly to telephones having a hands-free mode of operation.

2. Background

Typical state-of-the-art telephones often have a hands-free or speakerphone mode of operation, hereinafter generically "speakerphone." Such a telephone may be located at a convenient location and placed in hands-free mode. Thereafter, speakers, e.g., teleconference participants, may remain stationary or move about within range of the speakerphone as desired. The speakerphone microphone picks up all surrounding sound including background noise. This sound is transmitted to a listener at the other end of the call. Traditional speakerphones have a single microphone and are omnidirectional such that voice of the speaker and background noise are equally received and passed on to the listener.

Occasionally, background noise may be such that hands free operation is difficult to use if usable at all. Often the background noise originates from a single source that may be located at a fixed location within the room, e.g., from a noisy air conditioner or, from outside of the room such as from street work. To compensate for this background noise the microphone sensitivity may be lowered and the speakers may be requested to speak up. Sometimes this works, sometimes it does not. Also, the noise may be such that setting the microphone sensitivity at one level is an unacceptable solution, e.g., a pulsating type noise.

Thus there is a need for a speakerphone with capability of selectively removing background noise to provide improved audio quality, especially during hands free operation.

SUMMARY OF THE INVENTION

It is a purpose of the invention to improve a signal noise ratio for telephones operating in hands free mode of operation;

It is another purpose of the invention to improve the audio quality provided to a listener at a receiving ends of a hands free call;

The present invention is a telephone having a hands-free mode of operation. The telephone includes a pair of microphones spaced apart from each other. Each microphone receives sound in hands-free mode of operation and provides audio signals representative of received sounds. The audio signals from each microphone may be converted to digital audio signals. The digital audio signals are presented to a fixed delay path and a variable delay path. Audio signals from both paths are combined and filtered in an adjustable filter to remove noise based upon a prior determination of the noise source location and the voice spectrum derived from the digital audio signals.

Additional benefits and features of the invention will be apparent from the following detailed description taken together with the attached drawings.

DETAILED DESCRIPTION

Figure 1:
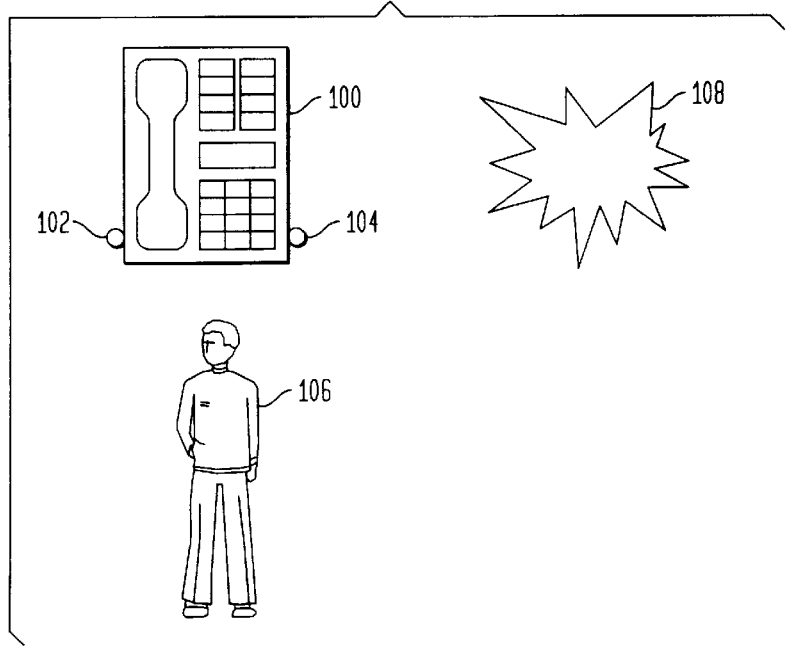
FIG. 1 shows an example of a preferred embodiment telephone having a hands-free mode of operation.

FIG. 1 shows an example of a preferred embodiment telephone 100 with a hands-free mode of operation that includes a first microphone 102 and a second microphone 104 being used by a speaker 106 in the presence of a noise source 108. Preferably, the microphones 102, 104 are identical non-directional microphones and are mounted internally to the telephone 100 and spaced as far apart as the telephone casing allows, e.g., in the two front corners of the telephone casing. Thus, a sound from either of speaker 106 or noise source 108 arrives at each of the microphones 102, 104 at slightly different times, normally exhibited as phase differences. Thus, the dual microphone speakerphone exhibits a directional microphone characteristic when the undelayed signals from the microphones 102, 104 are combined.

Figure 2:
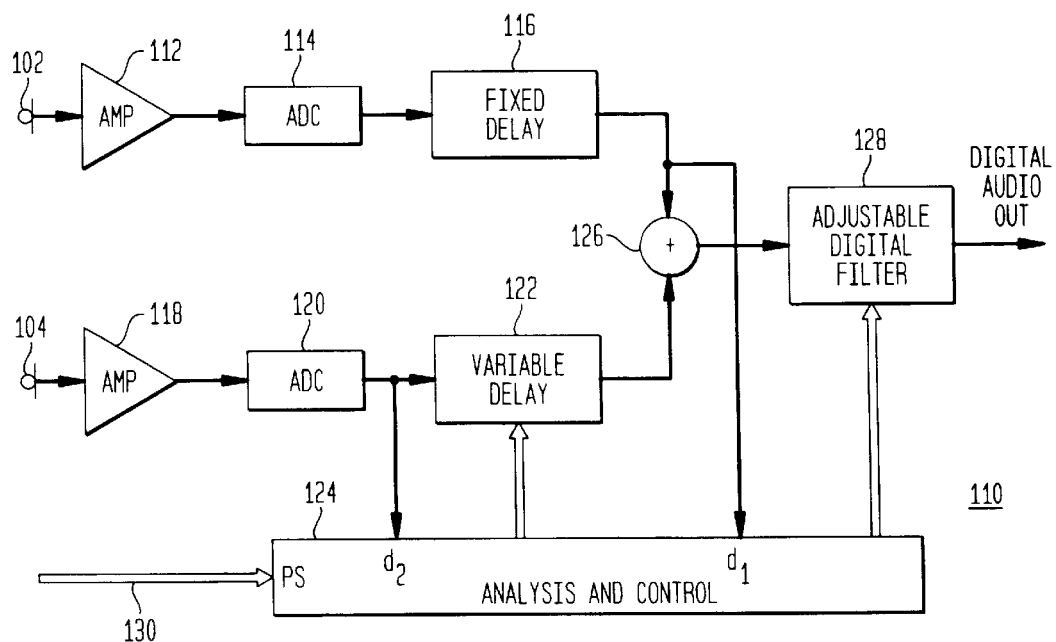
FIG. 2 shows a preferred embodiment hands-free mode circuit for a speakerphone such as the telephone of FIG. 1.

In an alternate embodiment the microphones are external to the speakerphone casing, wired to the speakerphone. A larger distance between the two microphones facilitates suppressing the lower frequency noise sources. However, this advantage is offset in that large spacing between the two microphones 102, 104 may result in unequal signal volume between the two microphones, especially, if the speaker is much closer to one microphone than to the other. Accordingly, this alternate embodiment may require additional logic/circuitry to compensate for different signal volume, e.g., one amplifier, e.g., 118 as shown in FIG. 2, may have an adjustable amplification factor.

Also, although the present invention is described herein as a digital embodiment, this is for example only. The hands-free telephone of the present invention may be implemented using analog components without departing from the spirit or scope of the invention. Further, directional microphones may be substituted for the above described non-directional microphones 102, 104, provided they are directed towards the expected speaker location and orthogonal to the line defined by the microphones.

For purposes of description of the invention, the distance between microphones 102 and 104 is referred to herein as $x_{12}$. The distance between speaker 106 and microphone 102 is referred to herein as $xu_1$. The distance between the speaker 106 and microphone 104 is referred to herein as $xu_2$. The distance between noise source 108 and microphone 102 is referred to herein as $xn_1$. The distance between noise source 108 and microphone 104 is referred to as $xn_2$. Although, it is understood that the speed of sound varies with media and ambient conditions, for the purposes of this invention and, because normal operating conditions of a speakerphone for such a conference call are approximately constant, the speed of sound is treated as a constant (c). Thus, the delay $\tau_1$ between the two microphones is determined by $x_{12}$ divided by c, i.e., $\tau_1 = x_{12}/c$. Noise originating at noise source 108 in FIG. 1 arrives at microphones 102, 104 at times offset by $(xn_1 - xn_2)/c$. Sound from a speaker 106 arrives at microphones 102, 104 at times offset by $(xu_1 - xu_2)/c$.

In the above alternate embodiment wherein microphones 102, 104 are external, $\tau_1$ may be derived directly. A tone may be radiated from one of the two microphones, e.g., 102. The delay between when the tone originates at the first microphone 102 and when it is received at the second microphone 104 is $\tau_1$.

FIG. 2 shows a preferred embodiment hands-free mode circuit 110 for a speakerphone such as telephone 100 of FIG. 1. Sound signals from one microphone 102 pass through a fixed delay path that includes an input amplifier 112, Analog-to-Digital Converter (ADC) 114 and fixed delay 116. Coincidentally, sound signals from the second microphone 104 pass through a variable delay path that includes an input amplifier 118, an ADC 120 and an adjustable variable delay 122. The outputs of fixed delay 116 and variable delay 122 are combined in adder 126. The outputs of ADC 120 and fixed delay 116 also are passed as inputs to Analysis and Control unit 124. The output of adder 126 is passed to Adjustable Digital Filter 128. Analysis and Control unit 124 provides control for both adjustable variable delay 122 and Adjustable Digital Filter 128. Adjustable Digital Filter 128 provides a digital audio output that is the audio signal passed to a listener at the other end of the call. Phone status signals 130 are passed as inputs to Analysis and Control unit 124.

The amplifiers 112, 118 of each path act as a preamplifier to amplify the sound signal from the particular connected microphone 102, 104. The output of amplifiers 112, 118 are each passed to a respective ADC 114, 120. The ADCs 114, 120 convert the analog outputs from the corresponding amplifiers 112, 118 to a digital output. The digital output signal from ADC 114 is passed to a fixed delay 116. Fixed delay 116 is set at $\tau_1$ (i.e., $x_{12}/C$). The digital output from ADC 120 is passed to adjustable variable delay 122. The Analysis and Control unit 124 may be a simple embedded processor or microcontroller (not shown) and appropriate program code, e.g., stored in a local read only memory (ROM) or electrically programmable ROM (EPROM). The Analysis and Control unit 124 controls delay in variable delay 122 and sets the filter bandwidth of Adjustable Digital Filter 128. Variable delay 122 has an adjustable delay of $\partial_2$ that may be adjusted to values ranging between 0 and $2\tau_1$.

In yet another alternate embodiment, both delays 116, 122 are adjustable variable delays, having a range between 0 and $\tau_1$. This alternate embodiment maintains overall circuit delay at a minimum. Accordingly, for this alternate embodiment, Analysis and Control unit 124 provides control to both adjustable delays.

Microphone input signals from microphone 102 ($d_1$) and from microphone 104 ($d_2$) are added constructively by setting $\tau_2=\tau_1-(xu_2-xu_1)/c$, which is maximum ($2\partial_1$) when the noise source is colinear with the microphones and separated from microphone 102 by microphone 104, i.e., microphone 104 is between noise source 108 and microphone 102. Thus, for the above described range of $\tau_2$, the signals at the two microphones 102, 104 may be added to produce a result wherein the resulting noise component varies between constructive and destructive interference, while the desired signals ($xu_1$, $xu_2$) from the speaker or speakers always add constructively to provide a positive audio component. Taking the analog sound signal from microphones 102, 104 to be $X_1$, $X_2$, respectively, $d_1=X_1(i+\tau_1)$ and $d_2=X_2(i)$, where $X(i)$ is the digital value of X at time i. Analysis and Control Unit 110 delays $X_2(i)$ between 0 and $2\tau_1$, first to identify the delay to minimize noise during baseline determination and second to determine the delay to maximize xu/xn during voice spectrum analysis. Also, voice spectrum analysis results are applied to Adjustable Digital Filter 128 to enhance frequencies originating primarily from the speaker, and to dampen frequencies that originate primarily or solely from the noise source 108. Therefore, as described hereinbelow, each of these frequency bands are identified in one of two different learning phases. In a first idle-state phase, the typical noise source spectrum is determined to identify the noise frequency bands. Then, in a speaker phase, the speakerphone is placed in hands-free mode and the composite sound that includes both noise and the speaker's voice is analyzed to determine the speaker's frequency spectrum.

Accordingly, having thus characterized the circuit response to both speaker input and noise input, the circuit may be calibrated to filter out noise. While it is preferred that the amplifiers 112, 118 as well as the ADCs 114, 120 are identical, in practice some slight differences always exist. These variations in or, differences between components in each of the paths may be compensated, preferably, during factory calibration, e.g., by adjusting the amplification factor of either or both of the amplifiers 112, 118. By selectively adjusting variable delay 122 it is possible to follow the speaker's voice as the speaker moves about the set of microphones 102, 104. This is analogous to pointing a single directional microphone automatically to the user. As the variable delay 122 is changed to compensate or to coordinate with changes of speaker location, background noise, which originates elsewhere, is dampened or, possibly, removed. The degree of dampening for the background noise depends upon its angle of origin and wavelength in relation to the noise source distance from the microphones 102, 104, i.e., lower frequency sound (sub 100 Hz) tends to be non-directional. Since the lower the frequency (f), the longer the wavelength (8), lower frequency sound is less subject to positional filtering and dampening. However, such low frequency noise may be removed with a simple low pass filter or its equivalent in Adjustable Digital Filter 128.

Figure 3:
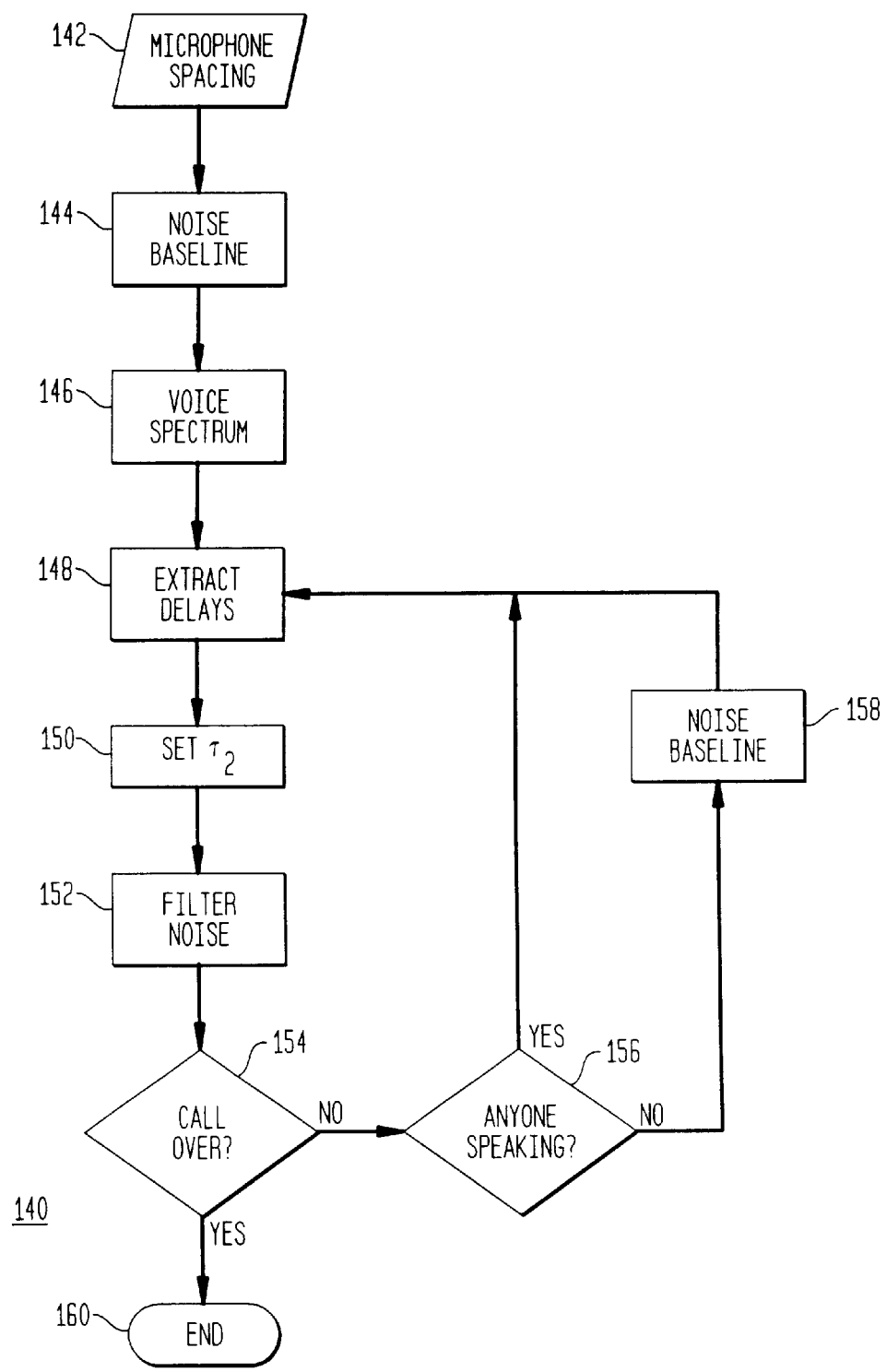
FIG. 3 is a flow diagram showing steps to set up and use a preferred embodiment speakerphone.

FIG. 3 is a flow diagram 140 showing set up and use of a preferred embodiment such as speakerphone 100 of FIG. 1. First, in step 142 the spacing between the microphones is input to determine $\tau_1$, e.g., entering the fixed delay between internal microphones 102, 104 at the factory or, for the above described external microphone embodiment, automatically measuring the delay between origination and reception of a tone. Then, in step 144 the background noise is checked. Typically, this check is done when the phone is idle such as prior to making a call, at the beginning of a conference call, etc. So, in this step 144 the phone is placed in hands free mode and silence is maintained to generate a noise baseline with any noise sources that happen to be within range of the phone. Next, in step 146, a second learning or voice baseline step, the speakerphone operates in hands-free mode and a speaker speaks from within range of the phone to obtain a voice spectrum signal. The Analysis and Control unit 124 processes the signals from both microphones to extract the voice spectrum from the background sounds using the background noise information obtained in step 144. The Adjustable Digital Filter 128 is adjusted to selectively enhance speech and suppress the background sounds.

So, in step 148 the Analysis and Control Unit 124 extracts delays both for noise sources and for voices as described hereinbelow with reference to FIG. 4. In step 150, the optimum delay to maximize the voice to noise signal ratio (xu/xn) is set for $\tau_2$, the adjustable variable delay 122 in the path from microphone 104. The path outputs from fixed delay 116 and variable delay 122 are combined in adder 126 and that sum is passed to the adjustable digital filter 128. In step 152 the adjustable digital filter is adjusted to maximize speech and, simultaneously, suppress noise with the filtered result being passed to called parties. As long as the call continues in step 154 and while the speaker is speaking in step 156, this variable delay calibration may be repeated, periodically, in step 148 to follow the speaker. Also, in step 156 when the Analysis and Control Unit 110 determines that no one is speaking, noise from the noise source may be re-analyzed in step 158 and the variable delay calibration repeated in step 148. When hands-free mode ends or the call ends in step 154, the filtering ends in step 160.

Figure 4:
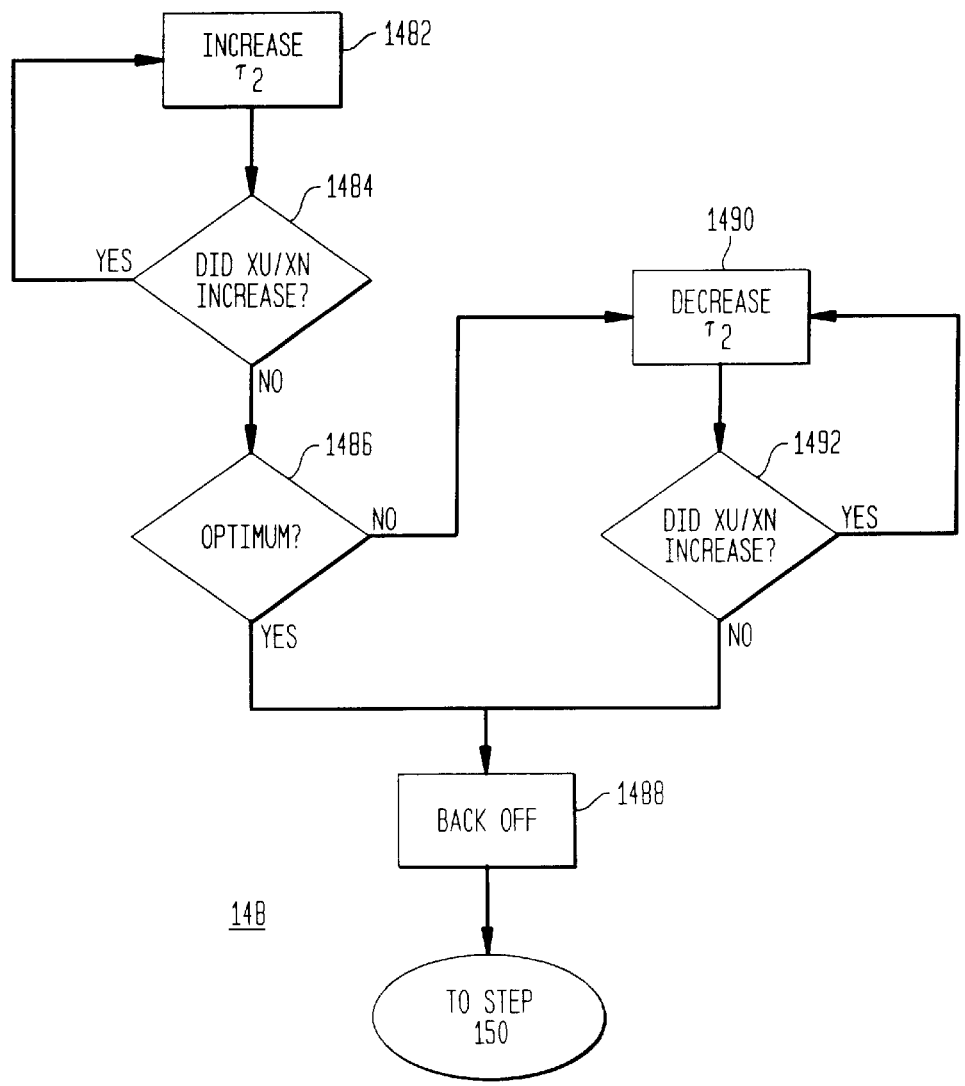
FIG. 4 is an example of how $\tau_2$ is determined.

FIG. 4 shows an example of how $\tau_2$ may be determined in step 148. Essentially, in each pass through step 148, $\tau_2$ is varied slightly (slightly increased/decreased) and, then, the speaker's voice to noise signal ratio (xu/xn) is checked until the optimum delay is found for $\tau_2$, i.e., where any change in $\tau_2$ reduces xu/xn. Adjustable variable delay 122 is then set to the optimum value of $\tau_2$ in step 150. During the initial pass through step 148, $\tau_2=\tau_1$ and xu/xn is marked or noted. Thereafter, in step 1482 the delay value for $\tau_2$ is increased slightly and in step 1484, xu/xn is checked to determine if it has increased. If xu/xn increases in step 1484 an optimum value has not yet been identified and, returning to step 1482, $\tau_2$ is increased again. Iteratively increasing $\tau_2$ and checking xu/xn in steps 1482, 1484 continues until $\tau_2$ is maximum ($2\tau_1$) or, xu/xn is not found to have increased in step 1484. If xu/xn decreases after the first increase of $\tau_2$ in step 1482 xu/xn is not optimum. Otherwise when xu/xn decreases, the optimum value of xu/xn has been found in step 1486 (i.e., one increment below the current value) and in step 1488, $\tau_2$ is backed off one increment (unless it is at its maximum value) and that value is passed to step 150.

If xu/xn decreases after the first increase, then the optimum value for $\tau_2$ has not been found in step 1486. So, the optimum value lies below the current value and in step 1490, the delay value for $\tau_2$ is decreased slightly and in step 1492 xu/xn is checked to determine if it has increased. Steps 1490, 1492 are repeated iteratively, decreasing $\tau_2$ and checking xu/xn until $\tau_2$ is minimum (0) or xu/xn is not found to have increased in step 1492. Again in step 1488, $\tau_2$ is backed off one increment (unless it is at its minimum value) and that value is passed to step 150.

Thus, the results of the analysis in the learning steps 144, 146 are combined to automatically maximize xu/xn and provide an optimal filter for the hands free phone. The result favors voice based signals over background noise.

Accordingly, the dual microphone hands free telephone provides a microphone characteristic that is superior to single microphone telephones, while using a non-mechanical, dynamically adjustable reception direction. The background and voice analysis as described for FIG. 3 provides an optimal filter for the dual microphone telephone. In particular analysis is simple enough that recalibration may be done periodically, manually or automatically throughout the call to identify background noise. The background noise may be analyzed while the telephone is idle or during hands free operation, if no one is speaking. The digital audio output may be provided to any typical telephone equipment, e.g., converting the filtered digital audio back to an analog signal for analog transmission or, sending it as voice over internet protocol (VoIP).

Thus, the dual microphone telephone of the present invention provides a significant audio quality improvement during hands free operation over prior art bands free telephones. Further, automatic recalibration may not require users to perform additional tasks or, at most, may require performing minimal additional tasks, e.g., initiating each of the learning steps.

While the invention has been described in terms of preferred embodiments, those skilled in the art will recognize that the invention can be practiced with modification within the spirit and scope of the appended claims.

What is claimed is:

1. A telephone having a hands-free mode of operation, said telephone comprising:
   a first microphone receiving sound in hands-free mode, and providing first audio signals representative of received sounds to a first delay path;
   a second microphone receiving said sounds in hands-free mode and providing second audio signals representative of said received sounds to a second delay path, said second microphone spaced a selected distance from said first microphone;
   an adder combining said first audio signals from said first delay path with said second audio signals from said second delay path;
   an analysis and control unit analyzing received said signals and adjusting delay through said second delay path; and
   an adjustable filter receiving combined said signals from said adder and filtering noise from said combined signals.

2. A telephone as in claim 1 wherein said first delay path is a fixed delay path, said second delay path is a variable delay path and said first audio signals from said fixed delay path and said second audio signals from said variable delay path are digital audio signals.

3. A telephone as in claim 2 wherein said fixed delay path provides a delay proportional to the selected distance between said first microphone and said second microphone.

4. The telephone as in claim 2 wherein the variable delay inserts a delay having a range less than twice the delay of said fixed delay path.

5. A telephone as in claim 1 wherein said adjustable filter is an adjustable digital filter providing a digital audio output.

6. A telephone as in claim 2 wherein each of said fixed delay path and said variable delay path comprises:
   an amplifier receiving an analog signal from a connected microphone; and
   an analog-to-digital converter (ADC) converting an output of said amplifier to a corresponding digital signal.

7. A telephone as in claim 6 wherein said digital signal from said ADC in said variable delay path is provided to said analysis and control unit.

8. A telephone as in claim 2 wherein said output from said fixed delay path is provided to said analysis and control unit.

9. A telephone as in claim 2 wherein said analysis and control unit further sets filter values in said adjustable digital filter.

10. A telephone as in claim 2 wherein the analysis and control unit comprises:
    means for varying the delay of said adjustable delay path;
    determining means for determining a ratio of a voice signal to a background noise signal; and
    means for identifying an increase in said ratio responsive to delay changes in said adjustable delay path.

11. A telephone as in claim 10 wherein said analysis and control unit further comprises:
    means for extracting a noise spectrum from a first signal; and
    means for extracting a voice spectrum from a composite signal, extracted said voice spectrum being compared against said noise spectrum in said determining means.

12. A telephone as in claim 11 wherein said adjustable digital filter is an adjustable bandpass filter and said analysis and control unit adjusts said adjustable bandpass filter to remove signals having frequencies outside of said extracted voice spectrum.

13. A method of controlling a speakerphone, said speakerphone having at least two microphones spaced a selected distance from each other, sound signals from each of said microphones being combined in said speaker phone and presented as a voice output from said speakerphone to a party at another end of a hands-free call, said method comprising the steps of:

a) taking a noise baseline at each of said microphones, said noise baseline providing a noise frequency spectrum of background noise;

b) taking a voice baseline at each of said microphones, said voice baseline providing a voice frequency spectrum of a speaker's voice;

c) comparing said voice baseline with said noise baseline to determine a substantially optimum delay for a signal path from one of said microphones;

d) setting a delay in said signal path responsive to said optimum delay; and e) filtering noise associated with said noise spectrum.

14. A method as in claim 13 wherein steps c) through e) are periodically repeated throughout a hands-free call.

15. A method as in claim 14 wherein at least one idle time is identified in said hands-free call and, at each said at least one idle time a new noise baseline is extracted from signals from said microphones.

16. A method as in claim 13 wherein the step c) of comparing said voice baseline with said noise baseline comprises the steps of:

i) incrementally increasing said delay;

ii) comparing a voice to noise signal ratio at said increased delay with a previous voice to noise signal ratio to determine if said voice to noise signal ratio is increased; and, iii) repeating steps i) and ii) until said voice to noise signal ratio is determined not to have increased.

17. A method as in claim 13 wherein the step c) of comparing said voice baseline with said noise baseline comprises the steps of:

i) incrementally decreasing said delay;

ii) comparing a voice to noise signal ratio at said increased delay with a previous voice to noise signal ratio to determine if said voice to noise signal ratio is increased; and, iii) repeating steps i) and ii) until said voice to noise signal ratio is determined not to have increased.

* * * * *